(12) United States Patent
Figueroa-Karlström

(10) Patent No.: US 9,625,248 B2
(45) Date of Patent: Apr. 18, 2017

(54) DEVICE AND METHOD FOR MEASURING ICE THICKNESS

(75) Inventor: Eduardo Figueroa-Karlström, Sköndal (SE)

(73) Assignee: SAAB AB, Linköping (SE)

( * ) Notice: Subject to any disclaimer, the term of this patent is extended or adjusted under 35 U.S.C. 154(b) by 1030 days.

(21) Appl. No.: 13/808,873

(22) PCT Filed: Jul. 5, 2010

(86) PCT No.: PCT/SE2010/050774
§ 371 (c)(1),
(2), (4) Date: May 29, 2013

(87) PCT Pub. No.: WO2012/005634
PCT Pub. Date: Jan. 12, 2012

(65) Prior Publication Data
US 2013/0238282 A1    Sep. 12, 2013

(51) Int. Cl.
*B64D 15/20* (2006.01)
*G01B 7/06* (2006.01)
*G08B 19/02* (2006.01)

(52) U.S. Cl.
CPC .............. *G01B 7/06* (2013.01); *B64D 15/20* (2013.01); *G08B 19/02* (2013.01)

(58) Field of Classification Search
CPC ......... B64D 15/20; G01B 7/06; G01N 27/041
See application file for complete search history.

(56) References Cited

U.S. PATENT DOCUMENTS

| | | | |
|---|---|---|---|
| 5,695,155 A | 12/1997 | MacDonald et al. | |
| 6,239,601 B1 | 5/2001 | Weinstein | |
| 6,384,611 B1 * | 5/2002 | Wallace | B64D 15/20 324/671 |
| 7,439,877 B1 * | 10/2008 | Jarvinen | B64D 15/20 340/581 |
| 2002/0156588 A1 | 10/2002 | Arndt et al. | |
| 2008/0257033 A1 | 10/2008 | Roberts | |
| 2009/0033502 A1 * | 2/2009 | Gualtieri | B64D 15/20 340/580 |
| 2009/0261811 A1 | 10/2009 | Gordon | |

FOREIGN PATENT DOCUMENTS

EP    2020380 A2    2/2009

OTHER PUBLICATIONS

PCT/ISA/210—International Search Report—Mar. 9, 2011 (Issued in PACT/SE2010/050774).

* cited by examiner

*Primary Examiner* — Mischita Henson
(74) *Attorney, Agent, or Firm* — Venable, LLP; Jeffri Kaminski

(57) ABSTRACT

A device and method for measuring ice thickness on a first surface of a construction element. The device includes a sensor arrangement arranged in connection with the construction element and arranged to provide signals related to an impedance. A processing unit is coupled to the sensor arrangement and arranged to determine the presence of ice based on the provided impedance signals. A reference sensor arrangement is arranged to generate reference impedance measurement signals. The processing unit is further arranged to determine the ice thickness based on determinations of a relation between the impedance signals determined by the sensor arrangement and the reference impedance values generated by the reference sensor arrangement.

7 Claims, 3 Drawing Sheets

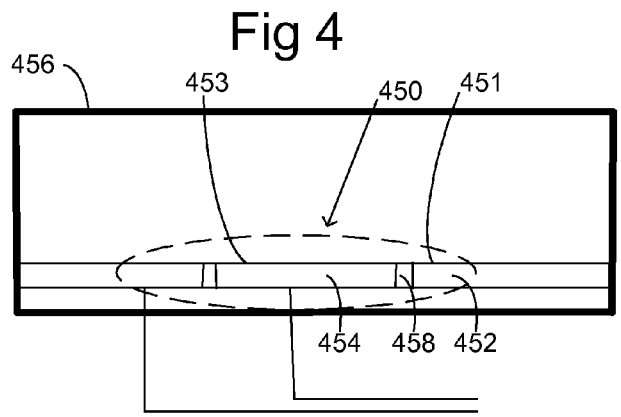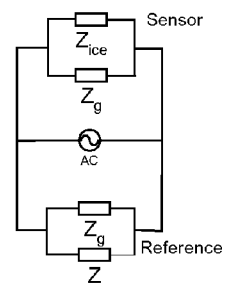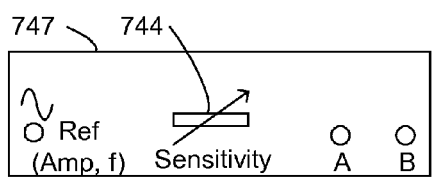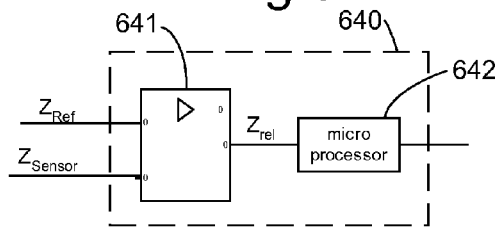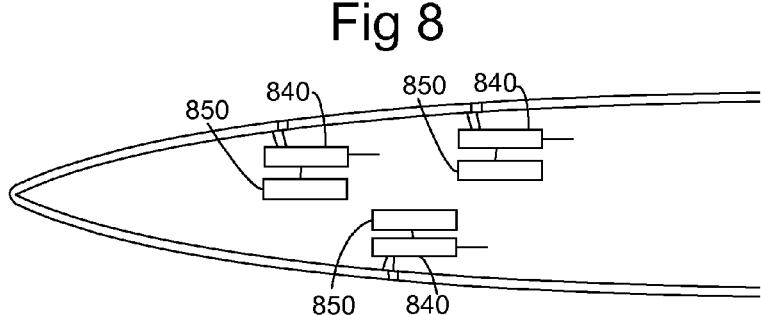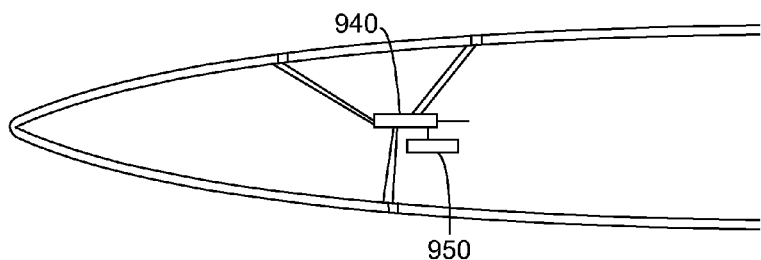

DEVICE AND METHOD FOR MEASURING ICE THICKNESS

CROSS-REFERENCE TO RELATED APPLICATIONS

The application is the national phase under 35 U.S.C. §371 of PCT/SE2010/050774 filed 5 Jul. 2010.

TECHNICAL FIELD

The present invention relates to a device and method for measuring ice thickness on a surface of a construction element, said device comprising a sensor arrangement arranged in connection with said construction element and arranged to provide values related to an impedance.

BACKGROUND ART

It is known that water/ice exhibit a phase transition while passing through 0° C. In particular, the values of the dielectric properties exhibit a dramatic change as the temperature is lowered across the freezing point. Furthermore, the conductivity of liquid water changes dramatically with its ionic content. This allows for use for use of total impedance measurements to the presence of either water or ice on for example a surface of an aircraft skin.

U.S. Pat. No. 6,239,601 describes a device and method for determining the thickness of a layer of solid ice, a mixture of ice and water or a mixture of ice and other liquid. The device comprises two impedance sensors operated at different frequencies. Each impedance sensor comprises two conductors. An impedance measuring unit is associated to each sensor, said impedance measuring unit being arranged to produce an output voltage dependent upon the total impedance changes sensed by the sensor. A processor is coupled to the measuring units to generate an output value using the measured output voltages. The output value is indicative of the thickness of the ice or ice and water mixture or ice and other liquid. The impedance sensors are embedded in an embedding material formed in a cavity of a surface if an aircraft, along with a temperature sensor.

One disadvantage with the device described in U.S. Pat. No. 6,239,601 is that a cavity for the electrodes is formed in the aircraft skin. The cavity introduces surface roughness perturbing laminar flow of modern aircraft. Furthermore, the device is complex due to the use of a plurality of electrodes.

US 2009/0261811 describe a device for detection of ice using a surface mounted sensor that can detect changes in permittivity to sense the presence of ice. The change in dielectric properties of overburden water and/or ice is detected using homodyne detection or another frequency selective detection scheme. In homodyne detection, the signal to be detected is mixed with a reference signal of the same frequency. In one example a lock-in amplifier is used as a homodyne detector.

The device used in US 2009/0261811 is based on the needs to be wormed up to repeat the process of detection to acquire statistical confidence. Thus, the important time aspect is not handled by the device.

SUMMARY OF THE INVENTION

It is one object to obviate at least some of the above disadvantages and provide an improved device for ice thickness measurements.

This has in one example been achieved by means of a device for measuring ice thickness on a first surface of a construction element. The device comprises a sensor arrangement arranged in connection with said construction element and arranged to provide values related to an impedance, a reference sensor arrangement and a processing unit coupled to the sensor arrangement and the reference sensor arrangement. The reference sensor arrangement is arranged to generate reference impedance values. The processing unit is arranged to determine the presence of ice based on determinations of a relation between the impedance values determined by the sensor arrangement and the reference impedance values generated by the reference sensor arrangement.

The use of a differential detection where the output of the sensor is compared to a reference value provides for a short response time, i. e. ice accretion can be detected fast. Further, the accuracy of the measurements can be unchanged during the life time of the device due to the fact that the reference sensor arrangement is not exposed to the environment.

In one option, the sensor arrangement comprises one first electrode separated from the construction element by an insulating gap, said electrode having a second surface. In accordance with this example, the device is so designed that it can be accommodated to any surface such that it is does not introduce roughness and geometrical variation or protrusions. Thereby, in an aircraft application, the mounting of the sensor arrangement at the wings or fuselage of the aircraft does not alter laminar air flow. Thus, the mounting of the sensor does not affect the aerodynamic of the aircraft.

In one option, the sensor arrangement and the reference sensor arrangement are operated at the same frequency.

In one option, the processing unit comprises a calculation unit arranged to calculate a thickness of the ice based on consecutive determinations of the relation between the impedance value and the reference impedance value. The calculation unit is then for example arranged to repeatedly calculate a mean value and a standard deviation value for the ice thickness.

In one option, the processing unit comprises a lock-in amplifier (641) arranged to output the relation between the impedance value and the reference impedance value. The lock-in amplifier is arranged to receive the impedance value and the reference impedance value on its inputs. The lock-in amplifier is phase locked at the same frequency as the operating frequency of the sensor arrangement and the reference sensor arrangement. The use of a lock-in amplifier allows for high precision, resolution and accuracy. The fact that the lock-in amplifier only operates at one frequency provides for a high level of noise rejection. Further, the use of a differentially connected sensor arrangement and reference sensor arrangement measured by means of measured a lock-in amplifier enables measurements to acquire various levels of accreted thickness with discrimination down to a fraction of a millimeter. Thereby, ice rejection actuators can be activated at the right moment in time for the highly demanding conditions of modern aircrafts where ice accretion is not allowed to be larger than a few millimeters.

A Wheatstone bridge could be comprised in the processing unit; however, the lock-in amplifier offers the advantages of significant noise reduction.

The invention also comprises a method for determining the presence of ice. The method comprises the steps of measuring impedance caused by an insulating gap between the construction element and an electrode formed therein, measuring reference impedance, and determining the presence of ice based on a relation between the measured impedance and the measured reference impedance.

In one option, the method comprises a step of measuring an impedance such as total impedance of two equally arranged electrode arrangements where ice accretion on the surface of one of them will add to the impedance of an insulating gap between a construction element and the electrode arrangement formed therein, and determining the amount of ice accreted on said one electrode arrangement and surrounding area with respect to the other, clean electrode, wherein ice thickness is linearly related to the accreted ice amount.

BRIEF DESCRIPTION OF THE DRAWINGS

FIG. 4 shows one example of a reference sensor arrangement of the device for measuring ice thickness in FIG. 1.

FIG. 5 is an electrical scheme schematically illustrating the measurements of the sensor arrangement and the reference sensor arrangement.

FIG. 6 shows one example of a processing unit in the device for measuring ice thickness in FIG. 1.

FIG. 7 shows one example of a lock-in amplifier of the processing unit of FIG. 6.

FIG. 8 shows one example of a device for measuring ice thickness having a plurality of sensor arrangements in accordance with a first embodiment.

FIG. 9 shows one example of a device for measuring ice thickness having a plurality of sensor arrangements in accordance with a second embodiment.

DETAILED DESCRIPTION

Figure 1:
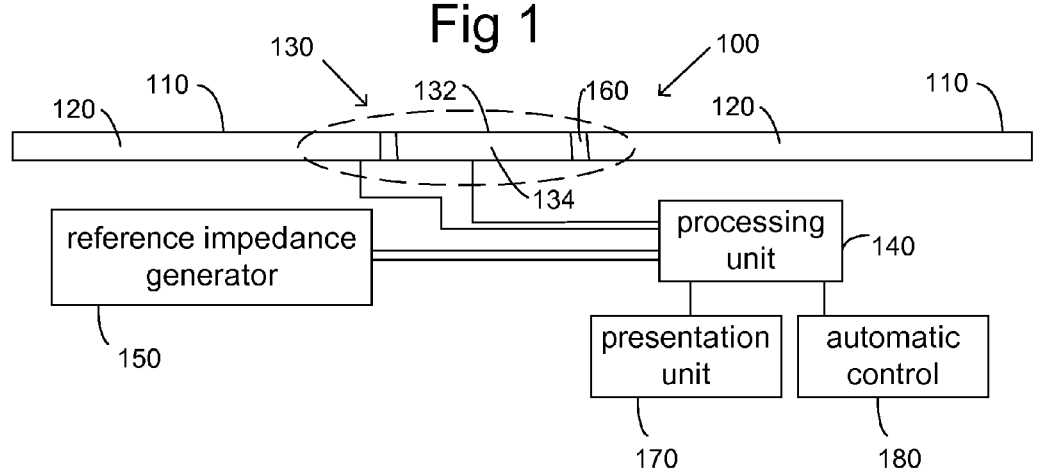
FIG. 1 shows one example of a device for measuring ice thickness.

In FIG. 1, a device for measuring ice thickness 100 on a surface 110 of a construction element 120 is depicted. The construction element 120 comprises in one example a metal such as aluminium or an alloy thereof. In one example, the construction element 120 is the wings or fuselage of an airborne vehicle such as an airplane. Furthermore, the device for measuring ice thickness could be adapted to curve parts of wings, fuselage, engine air intake or any other point at which ice accretion monitoring is wanted. Each construction element 120 is provided with one or a plurality of devices for measuring ice thickness 100.

The construction element 120 can be used in many other applications, aeronautical or not. In one example, the construction element 120 is incorporated in a stationary application.

The operation of the device for measuring ice thickness 100 is based on the temperature dependence of the dielectric property tensor of ice while the detection of water, water with ionic additives (environmental impurities, glycols or the like), or water and ice is based on the electrical conductivity of the mixed liquid phase. The real part of the dielectric constant shows a linear behaviour on temperature. Furthermore, at the liquid to solid state phase transition point, i.e. at 0° C., the dielectric constant of water exhibits a discontinuity. This discontinuity is used to detect the inception of ice formation.

The device for determining the presence of ice on the construction element surface comprises at least one sensor arrangement 130, at least one processing unit 140 and at least one reference sensor arrangement 150.

The sensor arrangement 130 is arranged in connection with said construction element 120 and arranged to measure impedance. The sensor arrangement 130 comprises an electrode 134. The electrode 134 is separated from the construction element by an insulating gap 160. In one example, the electrode is formed in the same material as the construction element 120. The electrode 134 has a second surface 132. In one example, the construction element 120 and the electrode 134 have the same thickness.

In an application, wherein the construction element is part of an aircraft wing or fuselage, the construction element surface 110 forms a grounding plane of the sensor arrangement. The electrode 134 and the grounding plane are electrically connected to inputs of the processing unit 140.

For an airborne vehicle having non-metallic fuselage or wing parts, such as parts made of fibre composite material, the construction element can be a metallic plate formed in the fibre composite fuselage or wing. In accordance with this example (not shown), wherein the fuselage or wing part is not metallic, an alternative grounding plane is to be found. In one example, grounding is provided by means of an electrical coupling to an aircraft conductive layer for lightning protection. In yet another, not shown, example grounding is provided by means of an electrical coupling to metallic armature inside the aircraft fuselage or wing.

The reference sensor arrangement 150 is arranged to generate reference impedance. In detail, the reference sensor arrangement comprises a reference sensor arrangement with an electrode and grounding plane geometrically identical to the sensor arrangement 130. The electrode and grounding plane of the reference sensor arrangement are electrically connected to inputs of the processing unit 140. The impedance generated by the reference sensor arrangement is designed so as to be the same as for the sensor arrangement 130, when the first and second surfaces of the sensor arrangement are clean and new. Due to ageing and wear of the sensor arrangement 130, slight erosion of the gap will likely occur. Although this can be compensated for with regular compensation or control in processing of the signals, it is estimated to be negligible while measuring in differential mode.

As stated above, signal of the sensor arrangement 130, i.e. the voltage across the electrode 134 and the grounding plane, and the reference sensor arrangement signals are the inputs to the processing unit 140. The processing unit 140 is arranged to generate an output value indicative of ice thickness based on the signals received on the inputs. The processing unit 140 is arranged to determine the ice thickness based on consecutive measurements of a relation between the impedance values determined by the sensor arrangement and by the reference sensor arrangement 150. In the shown example, a presentation unit 170 is arranged to receive information related to the determination of the ice thickness and to present that information. In one example, the information is visually presented. In an alternative or complementing example, the information is presented by means of a sound signal. In one example, the information is a digital signal transmitted for example to a mission computer of an aircraft, wherein it can be processed to be submitted to a pilot in for example visual or acoustic form or to be documented, saved etc. The visual presentation can for example be obtained by means of a display or lamp(s) or diode(s). In the shown example, a unit for automatic control is arranged to receive information related to the ice thickness and to actuate de-icing equipment based on the received information.

In one example (not shown) a heating element is arranged in relation to the sensor arrangement 130. The heating element can be activated so as to clean the surface from remaining ice for example after ice rejection attempts. This will allow the zeroing of the process after a successful de-icing attempt of the aircraft. Heating say one of the sensors among a plurality of them could serve as a control of the cleaning degree of the others after exposure to ice accretion or any other wetting surfactant.

Figure 2A:
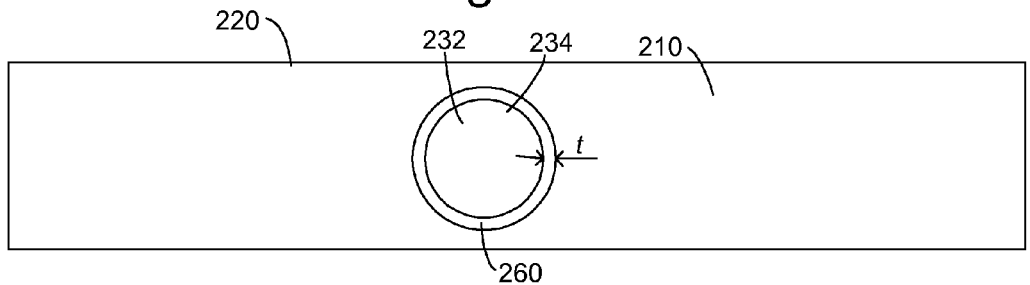
FIG. 2a is a top view of a sensor arrangement mounted at a first surface in accordance with one example of the device for measuring ice thickness of FIG. 1.
Figure 2B:
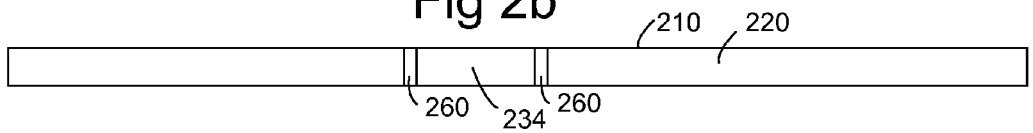
FIG. 2b is a side view of the sensor arrangement of the device for measuring ice thickness in FIG. 1.

In FIG. 2, a second surface 232 of an electrode 234 and a first surface 210 of a construction element 220 form an integrated surface. Thus, the second surface 232 forming an electrode 234 is arranged in relation to the first surface 210 and formed such that there are no discontinuities between the first surface 210 and the second surface 232. In the shown example, the integrated surface is flat. Accordingly, the second surface 232 is flat. In another example, the integrated surface is curved. Accordingly, the second surface 232 is adjusted to fit the curvature of the first surface 210. In the example of FIG. 2 (see FIG. 2a), the electrode 234 has a circular surface. The area of the electrode 234 can be freely adjusted to fit into a wanted specific application. The area of the electrode 234 can also be adjusted for optimizing signals; i.e. larger areas yield larger signal amplitudes while smaller areas yield smaller signal amplitudes. In one example the area of the electrode surface 232 is up to 30 cm². In one example, the area of the electrode surface 232 is larger than 5 cm².

An insulation gap 260 insolates the electrode from the construction element 220. The insulating gap 260 is in one example filled with a material of known dielectric properties. In one example, the gap is filled with a polymeric material. For example, the gap is filled with a polyolefin or any other polymer withstanding the current application. Alternatively the gap could be filled with a ceramic material. The gap filling material has in one example properties compatible with the application in which the ice thickness measurement is used. The gap filling material can for example be selected to have properties withstanding erosion action. The material is in one example provided as a ring mounted in the gap. In one example, the thickness t of the gap is 10 mm or less. In one example, the thickness t of the gap is within the range 1 to 3 mm. For larger values for the gap thickness t, the resolution in ice thickness measurements is lower and linearity problems occur at thicker ice levels of accretion.

The dimensions of the gap 260 can be chosen so as to optimize performance of the measurements and/or to fit aerodynamic applications. Factors which can be considered when choosing the geometrical dimension of the insulating gap comprise the rate of erosion (rain, sand, etc.) and the amount of insects which can be accumulated on the surface eventually bridging the electrode to the rest of the construction element surface due to accumulation of proteinic or amino acid accumulation. Further, a too wide gap leads to departure from linearity in thickness measurements much earlier compared to a narrow gap. Certainly, in practice, it has to be considered mounting and installation constrains that might suggest a different gap than any ideally optimized thickness value for the gap.

The electrode 234 could be chosen with any arbitrary shape providing that it is isolated from the rest of the wing or fuselage surface by a homogeneous isolating gap. Furthermore, the surface 232 of the electrode 234 could be equally adapted to curve parts of wings, fuselage, engine air intake or any other point at which ice accretion monitoring is wanted.

The rest of the surface of the wing or fuselage of the aircraft is seen as a ground plane against which total impedance measurements are made, wherein the reactive component is the one most affected by ice accretion.

Figure 3:
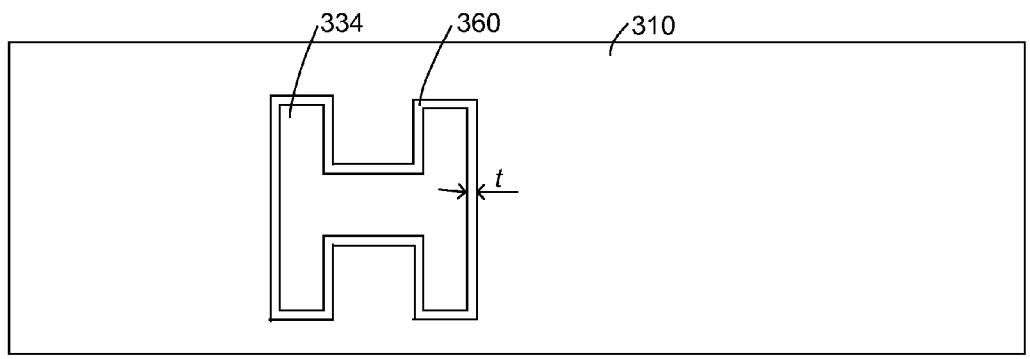
FIG. 3 is a top view of an alternative design of a sensor arrangement mounted at a first surface in accordance with one example of the device for measuring ice thickness of FIG. 1.

In FIG. 3, an electrode 334 as described above is mounted in a construction element separated from said construction element by an insulating gap 360. The electrode 334 has a complex shape.

In FIG. 4, a reference sensor arrangement 450 is mounted in an enclosed environment 456 such as a casing or canister. The reference sensor arrangement 450 comprises a reference electrode 454 arranged in relation to a reference construction element 452 so that a second reference surface 453 of the reference electrode 454 and a first reference surface 451 of the reference construction part 452 form an integrated surface. An insulation gap 458 insulates the reference electrode from the reference construction element 452. In the shown example, the casing or canister 456 forms ground for the reference sensor arrangement 455.

In ideal conditions, the sensor arrangement and the reference sensor arrangement are geometrically substantially identical, however, under careful controls the reference sensor arrangement could be selected such that its total impedance is comparable to the total impedance of a clean sensor at the same temperature.

As stated above, the reference sensor arrangement 450 is mounted in a close environment representing a clean and not worn first surface, second surface and gap filling material. In the above described example, the reference sensor arrangement set-up with the insulating gap 458 and construction element is designed to be identical to the measuring sensor arrangement 130.

The size of the casing 456 is in one example optimized so as to be spacious enough so that the electrical field generated by the reference sensor arrangement is substantially the same as that generated at the sensor arrangement. One limitation in optimizing the casing is of course available space.

In one example, the reference sensor arrangement is allocated as close as possible to the sensor arrangement 130 to ensure thermal equilibrium between them. A thermal sensor such as a PTC sensor could be attached to the device for measuring ice thickness for the sake of completion of the measurements performed and as redundancy. The purpose of the thermal sensor is mainly to call for attention when the temperature is closing 0° C. However, in spite of its numerous advantages, it is not mandatory to have it, although a Pt100 reliable PTC sensor can easily be accommodate in the electronic.

FIG. 5 is an electrical scheme schematically illustrating the measurements of the sensor arrangement and the reference sensor arrangement. A voltage is applied between the electrode in the sensor arrangement and ground. An impedance $Z_g$ is then provided due to the insulating gap between the sensor body and the construction element. If ice exists over-bridging the insulating gap, it results in an additional impedance $Z_{ice}$ as a consequence of the ice accretion between the first and second surfaces. Thus, the insulating gap impedance $Z_g$ and the ice impedance $Z_{ice}$ form electrically a parallel coupling with a source for the applied voltage.

Further, the very same voltage is also applied to the reference sensor arrangement of the reference sensor arrangement. An impedance $Z_{ref}$ is then provided due to the insulating gap between the reference electrode and the reference construction element.

The reference sensor arrangement has the purpose of providing reference impedance. This can be achieved in numerous ways. In the herein described example, it has been achieved by forming a reference sensor arrangement substantially identical to the sensor arrangement 130. The important thing is that the insulating gap impedance $Z_g$ and the free space impedance between the electrode and the earthed rest of the surface across the gap is equal to the reference impedance $Z_{ref}$ which encompass both a gap and a free space from the reference electrode to the earthed canister internal walls.

In one example the source for the voltage is arranged to operate in the radio frequency range. In one example the source for voltage is arranged to operate in the kHz-range. The voltage source can for example be arranged to operate at a frequency below 100 kHz. In practice, for example in an aeronautic application, frequency selection is made so as to avoid radio interference with radio equipments or EMI conflicts with equipment in the aircraft.

In FIG. 6, a processing unit 640 is arranged to determine the presence of ice based on the provided resulting outputs from a sensor arrangement and a reference sensor arrangement. In detail, the processing unit 640 comprises a comparator 641 arranged to determine the relation between the impedance value and the reference impedance value and a calculation unit 642 arranged to calculate a thickness of the ice based on consecutive determinations of the relation between output values from the sensor arrangement and the reference sensor arrangement.

In one example, the calculation unit 642 is arranged to repeatedly calculate a mean value and a standard deviation value for the ice thickness. In one example, the calculating unit 642 is arranged to calculate the mean value and standard deviation value based on the relation between the sensor arrangement output and the reference sensor arrangement output measured at time intervals of 5-15 seconds. In one example the time intervals are 10 seconds. The number of measurements performed during each time interval depends on the performance of the comparator 641 and the calculating unit 642. In one example, about 10 measurements are performed during each time interval; in another example about 20 measurements are performed during said time interval. Time intervals can be decided upon comparison of consecutive readings. A fast growing ice accretion demands short time intervals and consequently lower significance of statistics. The key issue is to deliver to a pilot reliable information on the growing rate of accreted ice.

The calculation unit 642 is then arranged to evaluate the obtained mean value and standard deviation value. If the obtained standard deviation value is smaller than a preset standard deviation value, the ice thickness is determined to be the mean value. In one example the preset standard deviation value for clear ice lies within the region 0.1-0.3 mm, for example 0.2 mm. If the obtained standard deviation value is larger than the preset standard deviation value, the mean thickness value is unreliable and there is a risk that ice accretion has started to build up fast. The thickness can for example be determined as the mean value plus the standard deviation value.

The mean value for the last ice thickness determination possibly corrected with the standard deviation value is in one example compared to a preset ice thickness value. In one example, information about the ice thickness is fed to the presentation unit once the preset ice thickness value has been exceeded. In yet another example, the unit for automatic control of de-icing is activated once the preset ice thickness value has been exceeded. In yet another example, the information about the ice thickness is fed to the presentation unit once the preset ice thickness value has been exceeded and the unit for automatic control of de-icing is activated if the ice thickness has not been decreased within a predetermined time after alarming by means of the presentation unit. In yet another example, the unit for automatic control is activated when a second, higher preset ice thickness value has been exceeded.

If the ice thickness and its standard deviation is unacceptable high, information about the ice thickness uncertainty is in one example fed to the presentation unit 170 for display. Alternatively, this information is fed to the presentation unit after a plurality of measurements with an unacceptable standard deviation value. In one example, the unit for automatic control 180 is activated if the standard deviation value is too high after one or more measurements of the mean value and the standard deviation value.

In one example the preset ice thickness value is for example 2-3 mm. The second, higher preset ice thickness value wherein de-icing is automatically activated is for example at 3 mm. These values are for example adapted for an aeronautic application. As the device for measuring ice thickness is fast, updated thickness measurements can be performed with timely intervals of seconds. This is important in for example the aeronautic application as ice accretion is fast.

At the initial stage, i.e., at very thin levels of ice accretion, say at fractions of a millimeter, the surface of ice accreted is not homogenous and thereby detection is affected by high level of uncertainty. However, laboratory trial shows that thickness down to about 0.6-0.8 millimeters could still be measured.

The calculation unit could comprise a set of different algorithms for performing different operations. For example, the time interval between updated thickness determinations, algorithms may be implemented for determining ice accretion growing rate, etc.

The calculation unit 642 is for example implemented in a microprocessor. Furthermore, the processing unit herein described could be miniaturized to ensure weight to volume ratios suitable for demands on aircraft.

In FIG. 7, the comparator comprises a lock-in amplifier 747 arranged to output the relation between the impedance value and the reference impedance value. The lock-in amplifier 747 comprises an internal oscillator that generates a reference voltage that can be used with or without amplification to excite the sensor arrangement and the reference sensor arrangement. The reference voltage is provided by means of an output Ref of the lock-in amplifier. The reference voltage has a predetermined amplitude U and a predetermined frequency f. In one example the amplitude is about 1 Volt. The frequency selection has been discussed above. The lock-in amplifier 747 further comprises a first input A and a second input B. The inputs A, B are phase locked. The lock-in amplifier is arranged to receive the sensor arrangement output and the reference sensor arrangement output on the first input A and the second input B, respectively.

An optional possibility of the set-up is to use the reference signal to obtain an output from the reference sensor arrangement while the signal from the sensor arrangement could be phase shifted by 180° ($\pi$). Thereafter, by means of a low impedance voltage divider (ideally negligible impedance) a fraction could be selected from the reference signal as to cancel the one from the sensor whereby the lock-in amplifier works rather like a precision phase-locked zero detector.

The lock-in amplifier has further a device 744 for setting the measuring range. Ice measurements are performed within a voltage range corresponding to impedances measured when ice is coating the construction elements.

However, the device for measuring ice thickness can also be used for measuring in other ranges so as to detect presence of for example glycol and/or water and/or ice. Thus, the impedance measuring range can be altered in such a way that highly conductive liquids can also be detected (polluted water, deicing fluids, conducting water with high salinity levels i.e. ionic content, etc.). In accordance with this example, a database or the like is provided of existing levels of water pollution or antifreezing liquids conductivities. Thus, a proper calibration of the measuring system settings of the measuring range can be selected to perform correct measurements with the system. With such measuring capability implemented in addition to ice thickness measurements, it could be possible to provide information for example to a pilot of the degree of pollutant agents content of the wetting liquid or its nature (type of antifreezing liquid, etc.).

It should be mentioned that whenever a low noise, high resolution and sensitivity, etc., is wanted, the methods hereby described could be of grate advantage and outstanding performance. Such could be the case of any sensor delivering a low voltage output.

In FIG. 8, a composition is shown in a construction such as an aircraft wing, wherein a plurality of devices for ice thickness measurements is formed, wherein each device for ice thickness measurement has an individual reference sensor arrangement 850 and processing unit 840.

In FIG. 9, a composition is shown in a construction such as an aircraft wing, wherein a plurality of devices for ice thickness measurement are formed, wherein the devices share one reference sensor arrangement 950 and processing unit 940.

Figure 10:
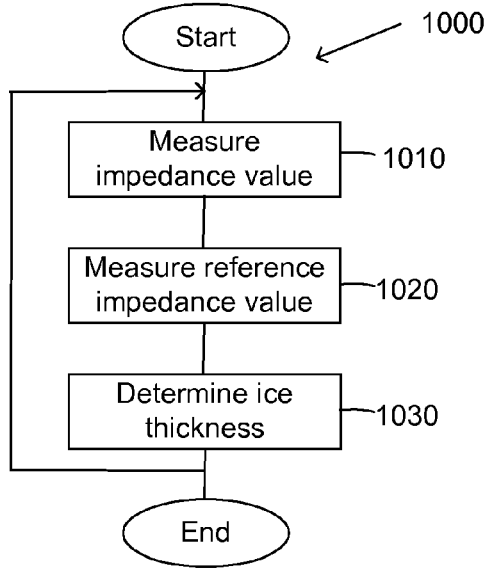
FIG. 10 is a flow chart showing an example of a method for measuring ice thickness.

In FIG. 10, a method 1000 for measuring ice thickness on a first surface of a construction element comprises the following steps: measuring 1010 an impedance caused by an insulating gap between the construction element and an electrode formed therein, measuring 1020 a reference impedance, and determining 1030 ice thickness based on a relation between the measured impedance and the measured reference impedance. The measuring steps 1010, 1020 are performed in parallel.

Figure 11:
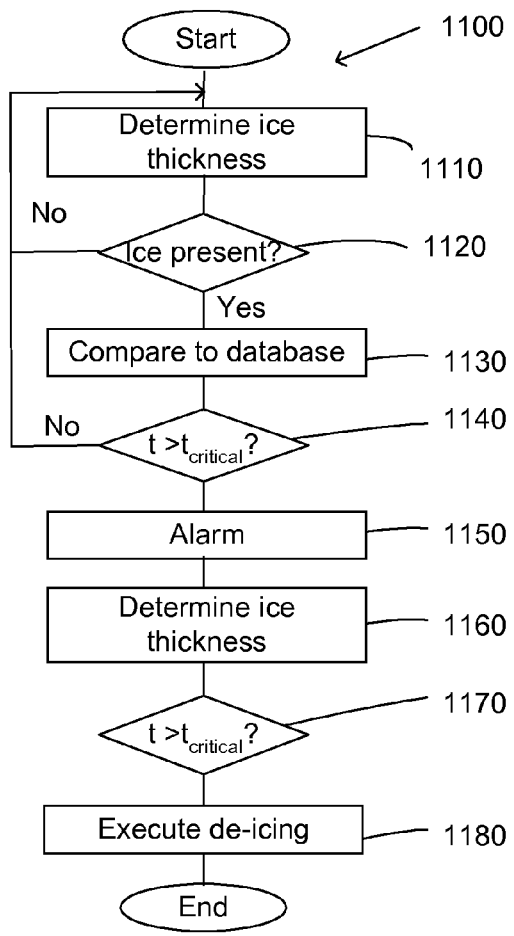
FIG. 11 is a flow chart showing a method for initiating activation of a de-icing system based on the ice thickness measured in accordance with the method of FIG. 10.

In FIG. 11, a method 1100 for initiating activation of a de-icing system comprises the following steps. In a first step 1110, the ice thickness is determined. If the ice thickness is thinner than let us say 0.6 to 0.8 mm, ice will not be detected. This is due to the fact that the second surface of the sensor arrangement is not completely covered with ice. Once ice can be detected (step 1120), the measured ice thickness is compared 1130 to a critical value $t_{critical}$. In one example, $t_{critical}$=3 mm. If the ice thickness is determined to be bigger than the critical value $t_{critical}$ in step 1140, an alarm is activated. In an aeronautic application, the alarm is arranged to be activated in cockpit. The alarm can be a sound or visual, as discussed above. If after a new determination of the ice thickness 1160, it can be established that the thickness is equal or has increased in relation to the preceding measurement, de-icing is activated automatically 1180.

The different levels of alarms could be applied in numerous ways. In one example, a first warning is issued, just at ice inception initiation. A second alarm level could be dictated by maximum permissive level of ice accretion according to specific aircrafts. Accordingly, the first warning to the pilot can be issued when the ice layer is thicker than 1 mm, the second warning can be issued at a dangerous level of accretion demanding manual action and, finally a warning may be issued to the pilot saying that action has been undertaken automatically due to the accreted level of ice approaching levels close to serious flying security risks.

The invention claimed is:

1. A device for measuring ice thickness on a first surface of a construction element, said device comprising:
   a sensor arrangement arranged in connection with said construction element and arranged to provide impedance values,
   a reference sensor arrangement arranged to generate reference impedance values, and
   a processing unit coupled to the sensor arrangement and to the reference sensor arrangement and arranged to determine the presence of ice based on the provided impedance values,
   wherein the sensor arrangement comprises one first electrode separated from the construction element by an insulating gap, wherein the first electrode is formed by the same material as the construction element and has a second surface, and wherein the construction element forms a grounding electric plane;
   wherein the reference sensor arrangement set-up is designed to be identical to the sensor arrangement and is arranged to generate substantially the same impedance values as the sensor arrangement when the first and second surfaces are clean; and
   wherein the processor unit is arranged to determine the ice thickness based on determinations of a relation between the impedance values determined by the sensor arrangement and the reference impedance values generated by the reference sensor arrangement.

2. The device according to claim 1, wherein the electrode is arranged in relation to the construction part so that the second surface and the first surface form an integrated surface.

3. The device according to claim 1, wherein the sensor arrangement and the reference sensor arrangement are operated at the same frequency.

4. The device according to claim 1, wherein the processing unit comprises a calculation unit arranged to calculate a thickness of the ice based on consecutive determinations of the relation between the impedance value and the reference impedance value.

5. The device according to claim 4, wherein the calculation unit is arranged to repeatedly calculate a mean value and a standard deviation value for the ice thickness.

6. The device according to claim 4, wherein the calculation unit is implemented in a microprocessor.

7. The device according to claim 1, wherein the processing unit comprises a lock-in amplifier arranged to output the relation between the impedance value and the reference impedance value, wherein said lock-in amplifier being arranged to receive the impedance value and the reference impedance value on its inputs of the lock-in amplifier.

* * * * *